(12) United States Patent
Vadamalu et al.

(10) Patent No.: US 11,592,357 B2
(45) Date of Patent: Feb. 28, 2023

(54) TEST BENCH AND METHOD FOR PERFORMING A DYNAMIC TEST RUN FOR A TEST SETUP

(71) Applicant: AVL LIST GmbH, Graz (AT)

(72) Inventors: Raja Sangili Vadamalu, Darmstadt (DE); Christian Beidl, Eggersdorf (AT); Maximilian Bier, Darmstadt (DE)

(73) Assignee: AVL LIST GMBH

( * ) Notice: Subject to any disclaimer, the term of this patent is extended or adjusted under 35 U.S.C. 154(b) by 335 days.

(21) Appl. No.: 16/958,353

(22) PCT Filed: Dec. 28, 2018

(86) PCT No.: PCT/EP2018/097062
§ 371 (c)(1),
(2) Date: Jun. 26, 2020

(87) PCT Pub. No.: WO2019/129835
PCT Pub. Date: Jul. 4, 2019

(65) Prior Publication Data
US 2021/0063277 A1    Mar. 4, 2021

(30) Foreign Application Priority Data
Dec. 29, 2017    (AT) ............... A 51086/2017

(51) Int. Cl.
*G01M 15/02*    (2006.01)
*G01L 3/16*    (2006.01)
*G01M 15/04*    (2006.01)

(52) U.S. Cl.
CPC ............... *G01M 15/02* (2013.01); *G01L 3/16* (2013.01); *G01M 15/042* (2013.01)

(58) Field of Classification Search
CPC .................................................... G01M 15/02
See application file for complete search history.

(56) References Cited

U.S. PATENT DOCUMENTS 11,255,749 B2 * 2/2022 Kokal ............. G06F 5/06
2013/0304441 A1   11/2013 Fricke
(Continued)

FOREIGN PATENT DOCUMENTS

DE    102006025878 A1    12/2006
EP           1452848 A1     9/2004
(Continued)

OTHER PUBLICATIONS

Austrian Search Report Application No. A 51086/2017 Completed: Oct. 31, 2018 1 Page.
(Continued)

*Primary Examiner* — Eric S. McCall

(57) ABSTRACT

To improve the identification of system parameters of a test setup of a test bench there is provision for the test setup to be dynamically excited on the test bench by virtue of a dynamic input signal being applied to the test setup. Measured values of the input signal of the test setup and of a resultant output signal of the test setup are recorded. A frequency response of the dynamic response of the test setup between the output signal and the input signal is determined using a nonparametric identification method. A model structure of a parametric model that maps the input signal onto the output signal is derived from the frequency response. The model structure and a parametric identification method are used to determine at least one system parameter of the test setup, and the at least one identified system parameter is used to perform the test run.

18 Claims, 3 Drawing Sheets

(56) References Cited

U.S. PATENT DOCUMENTS

| | | | |
|---|---|---|---|
| 2018/0335370 A1* | 11/2018 | Maschmeyer | G01M 17/007 |
| 2020/0333201 A1* | 10/2020 | Vadamalu | G01L 25/003 |
| 2021/0088410 A1* | 3/2021 | Bier | F02D 35/023 |
| 2021/0096040 A1* | 4/2021 | Bier | G01M 15/02 |

FOREIGN PATENT DOCUMENTS

| | | |
|---|---|---|
| JP | 2006300683 A | 2/2006 |
| JP | 2006300683 A | 11/2006 |
| JP | 2007163164 A | 6/2007 |
| JP | 2017122642 A | 7/2007 |

OTHER PUBLICATIONS

Christian Matthew et al: "Chassis Dynamometer Torque Control System Design by Direct Inverse Compensation", 6th Biennal UKACC International Control Conference (ICC '06), AT Glasgow, published Sep. 1, 2006. 8 Pages.

Pintelon, R. et al: "Estimation of non-paramteric noise and FRF models for multivariable systems"—Part I Theory, Mechanical Systems and Signal Processing, vol. 24, Issue 3, published 2010. pp. 573-595.

International Search Report & Written Opinion of the International Search Authority Application No. PCT/EP2018/097062 Completed: Mar. 26, 2019; dated Apr. 3, 2019 14 Pages.

Translation of Internation Search Report Application No. PCT/EP2018/097062 Completed: Mar. 26, 2019; dated Apr. 3, 2019 3 Pages.

Kuttner, Thomas: "Praxiswissen Schwingungsmesstechnik" Springer Vieweg, published 2015. pp. 325-335.

L. Ljung: System Identification: Theory for the User, 2nd Edition PTR Prentice Hall Information and System Sciences Series, published 1999, ISBN 0-13-656695-2. 631 Pages.

Chinese Office Action; Application No. 201880083971.3; dated Aug. 4, 2021; 17 Pages.

* cited by examiner

TEST BENCH AND METHOD FOR PERFORMING A DYNAMIC TEST RUN FOR A TEST SETUP

TECHNICAL FIELD

The present teaching relates to a test bench and a method for carrying out a dynamic test run for a test setup on a test bench, the test setup comprising at least one torque generator, which is mechanically coupled on the test bench with at least one torque sink by means of a coupling element, and wherein the torque generator, the coupling element, and the torque sink are described with system parameters characterizing the dynamic response.

BACKGROUND

The development of drive units, such as internal combustion engines or electric motors, of drive trains with such drive units or of drive train components with such drive units, largely take place on test benches. Likewise, the calibration of a control function or regulation function of a vehicle, for example to meet legal requirements, such as, for example, the emission behavior, usually takes place on a test bench. To carry out a bench test on the test bench, the test object, i.e. the drive unit or the drive train or the drive train component, is connected to a load machine (usually an electric motor, also called a dynamometer) to form a test setup on the test bench in order to be able to operate the test object against a load. The test object and load machine are usually coupled using coupling elements such as test bench shafts, coupling flanges, etc. The test setup consisting of the test object, coupling element and load machine forms a dynamic system that responds according to the dynamic response of the system when excited (for example, by the combustion shocks of an internal combustion engine or by load jumps). Of course, excitations with a natural frequency of the dynamic system are critical on the test bench, since this can create critical states that can even damage or destroy certain parts, in particular the coupling elements, of the test setup on the test bench. Knowledge of the dynamic response of the test setup is therefore important for carrying out bench tests on a test bench.

However, controllers are also used on the test bench to control components of the test setup, in particular the load machine and a drive unit, for carrying out the bench test. For the design of the controller, precise knowledge of the dynamic response of the test setup is also desirable in order to be able to adapt the controller response to it and/or to ensure the stability of the control system.

Last but not least, so-called observers are often used on a test bench in order to calculate non-directly measured or non-directly measurable quantities of the test setup from other accessible or available measurement variables. An example of this is the internal torque of the drive unit, i.e. the torque actually generated and not the torque provided, that is often required or used on the test bench for the test run.

For the design of a controller and/or an observer, a model of the dynamic system, i.e. the test setup, is generally required, which requires sufficient knowledge of the dynamic system.

The dynamic response of the test setup on the test bench is primarily determined by the inertia of the components of the test setup (in particular the test object and the load machine) and by the stiffness, possibly also the damping, of the coupling between the test object and the load machine (i.e. between the mass-loaded components of the test setup), for example, the torsional rigidity of a test bench shaft. These parameters are often determined individually for each component or are known from data sheets for the respective component. In practice, however, the use of these known parameters is often unsatisfactory when carrying out the test run and has often led to poor results. The reason for this is that adaptations of the mechanical setup of the test setup are often made on the test bench, which changes the dynamic system. For example, other measuring sensors, for example a torque sensor on the test bench shaft, are used, or mechanical components are exchanged or added or removed on the test bench. For example, an adapter flange between two components of the test setup can be changed. The properties of components in the test setup can also change due to aging, which also affects the response of the dynamic system.

From DE 10 2006 025 878 A1, it is therefore already known to determine the parameters of the dynamic response directly on the test bench. For this purpose, the test setup is dynamically excited by a pseudo-stochastic speed stimulation and the parameters of a model of the dynamic system, in particular stiffness and damping of a connecting shaft, are determined using methods of the identification theory. With the identified parameters of the model of the test setup, the response of the test setup can be described with sufficient accuracy and used for the design of an observer or a controller, but also for monitoring the system. In this approach, a parametric model of the test setup is used, i.e. a model that contains the parameters of the dynamic system and that reproduces the input/output response of the dynamic system. The parameters are ascertained as the poles of the dynamic system. A difficulty with this method is that the resultant torques have to be measured as output variables of the dynamic system due to the speed stimulation, which is difficult in practice on the test bench. Apart from this, certain assumptions about the model structure must be made in advance in order to be able to determine the parameters of an adopted model. If an unsuitable model structure is selected, the real dynamic response is only partially or inaccurately reproduced by the model. In practice, however, the correct choice of the model structure is a difficult task, especially in the case of more complex test setups with a plurality of masses and couplings in between, and can only be carried out by specialists, which limits the applicability of the method. In addition, no noise of a measurement signal (e.g. a measured speed) is taken into account during identification, which can lead to a poorer identification result. In addition, identification in DE 10 2006 025 878 A1 takes place in an open loop, although the measurement signals on the test bench were measured in a closed control loop. This can also reduce the quality of identification. Last but not least, pseudo-stochastic speed stimulation cannot be set to the desired or required frequency range. This can lead to certain frequencies not being stimulated at all or more frequencies than required being stimulated, which can also have a negative effect on the quality of identification.

SUMMARY

It is therefore an object of the present teaching to improve the identification of system parameters of a test setup of a test bench, particularly with regard to the quality of the identification.

This object is achieved according to the present teaching in that the test setup is dynamically excited on the test bench by virtue of a dynamic input signal being applied to the test setup and, in the process, measured values of the input signal of the test setup and of a resultant output signal of the test setup are recorded, a frequency response of the dynamic response of the test setup between the output signal and the input signal is determined from the recorded input signal and output signal using a nonparametric identification method, a model structure of a parametric model that maps the input signal onto the output signal is derived from the frequency response, the model structure and a parametric identification method are used to determine at least one system parameter of the test setup, and the at least one identified system parameter is used to perform the test run. This allows a systematic identification of the required system parameters, whereby a basic characterization of the dynamic response of the test setup is carried out, from which the model structure on which the test setup is based can be derived. With the nonparametric identification, a suitable choice of the model structure can be ensured regardless of the complexity of the test setup. The following parametric identification then uses the knowledge of the model structure to determine the system parameters. An additional advantage can be seen in the fact that the nonparametric identification as well as the parametric identification uses the same measurement variables, which facilitates the implementation of the identification method.

With the nonparametric identification method, measurement noise of the input signal and/or of the output signal can also be taken into account, whereby the quality of identification can be improved. In addition, the nonparametric identification method can also be used to ascertain a variance of the measurement noise of the output signal and/or a variance of the measurement noise of the input signal, and/or a covariance of the noise between input and output. These variances are then also available for use in the parametric identification process.

Model parameters of the parametric model are advantageously determined using the parametric identification method and from this, by comparing the parametric model with a physical system model having the at least one system parameter, the at least one system parameter of a system component of the test setup is determined. This can be facilitated if the parametric model is divided into sub-models, each having model parameters, and by comparing at least one sub-model with a physical sub-model with the at least one system parameter, at least one system parameter is determined from the model parameters of the sub-model.

The at least one identified system parameter can be used for carrying out the test run by using the at least one system parameter for designing a controller for at least one component of the test setup. Or by using the at least one system parameter for designing a filter that either filters a setpoint for a controller for at least one component of the test setup or a control deviation supplied to a controller for at least one component of the test setup. Or by monitoring a change in the at least one system parameter over time. Or by using the at least one system parameter to adapt the dynamic response of the test setup to a desired dynamic response.

BRIEF DESCRIPTIONS OF THE DRAWINGS

In the following, the present teaching is described in greater detail with reference to FIGS. 1 to 6 which, by way of example, show schematic and non-limiting advantageous embodiments of the present teaching. In the drawings.

DETAILED DESCRIPTION

Figure 1:
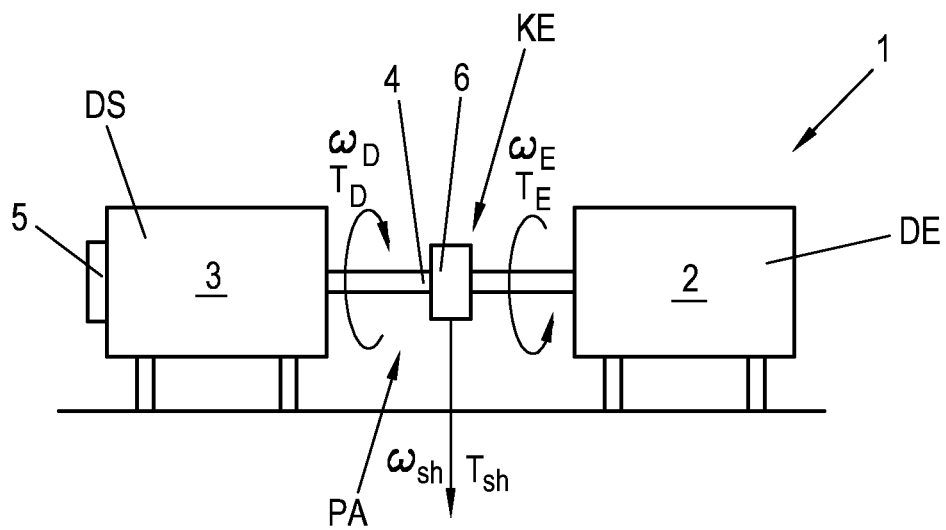
FIG. 1 shows a test bench having a two-mass oscillator as a test setup.

For carrying out a test run, the present teaching assumes a test setup PA on a test bench 1 with a test object having a torque generator DE, for example a drive unit such as an internal combustion engine 2, and a torque sink DS coupled therewith, for example a load machine 3 (dynamometer), as load, as shown in a simple embodiment in FIG. 1. The torque generator DE is, for example, an internal combustion engine 2, but can also be a drive train having an internal combustion engine 2 and/or an electric motor, or a part thereof. The test object comprises at least one torque generator DE. The torque generator DE and the torque sink DS are mechanically coupled to one another via at least one coupling element KE, for example a test bench shaft 4, for transmitting a torque. The coupling element 4 can also comprise a plurality of non-negligible mass-bearing mechanical components, for example coupling flanges, gears, etc. This means that the test setup PA can become arbitrarily complex with regard to the components that influence the dynamics. The dynamic response of the test setup PA is determined in a known manner primarily by the inertia J of the components of the test setup PA (i.e. by the non-negligible, mass-bearing parts) and the type of coupling (stiffness c, damping d) between them. To carry out a bench test with such a test setup PA, it is important to know the dynamic system parameters in order to know the dynamic response of the test setup PA. For example, knowledge of the resonance frequencies $\omega_R$ of the test setup PA is important in order to avoid excitation in the range of the resonance frequencies $\omega_R$. Apart from this, the test run on test bench 1 is intended to simulate the response of the test object that would result if the test object was installed in a real vehicle and moved with the real vehicle. It is therefore important in this context that the dynamic response of the test object on the test bench 1 roughly corresponds to the dynamic response in the vehicle in order to allow realistic test runs. If the dynamic system parameters of the test setup PA are known, then specific measures can be taken on the test bench 1, for example mechanical measures such as additional or different masses, stiffnesses and/or dampings, or control-related measures such as adding filters and/or controllers, in order to adapt the dynamic response on the test bench 1 to the real response. The system parameters are also required for the design of possible controllers for controlling certain components of the test setup PA, for example a dyno controller $R_D$ for the load machine 3, in order to be able to optimally adapt the controller response to the specific dynamic response of the test setup PA.

The present teaching assumes that dynamic system parameters describing the dynamic response, in particular mass torques of inertia J, torsional rigidities c, torsional dampings d, resonance frequencies $\omega_R$ or eradication frequencies $\omega_T$, of the concrete test setup PA, are, at least in part, not known and are to be determined before a bench test is carried out on the test bench 1.

For this purpose, according to the present teaching, the basic character of the dynamic response of the test setup PA is first determined using a nonparametric identification method, from which a model structure of a model of the test setup PA with system parameters SP of the test setup PA describing the dynamic response is derived. The system parameters SP of the model are then determined using the model structure with the system parameters SP using a parametric identification method. With nonparametric identification, only the measured input signals u(t) and measured output signals y(t) are examined.

Using the nonparametric identification method, the frequency response (characterized by the amplitude, and possibly also the phase, by frequency) of the test setup PA is determined. For the frequency response, it is known to excite the physical dynamic system (here the test setup) with a dynamic signal u(t) (input signal) with a certain frequency content and to measure the response y(t) (output signal) on the test setup PA. The input signal u(t) is, for example, a speed $\omega_D$ of the torque sink DS (for example load machine 3) and the output signal y(t) is, for example, a shaft torque $T_{sh}$ on the test bench shaft 4 or a speed $\omega_E$ of the torque generator DE. Typically, measuring sensors MS are also provided on a test bench 1 in order to detect the measured values MW of certain measurement variables (input signal u(t), output signal y(t)) (FIG. 6), for example a speed sensor 5 for detecting the speed wo of the load machine 3 and/or a torque sensor 6 for detecting a shaft torque $T_{sh}$, as shown in FIG. 1. Other measurement variables can also be measured, such as the rotational speed $\omega_E$ or the torque $T_E$ generated by a torque generator DE (e.g. internal combustion engine 2) or the torque $T_D$ of the torque sink DS.

However, it is not important what is used as the input signal u(t) and what is used as the output signal y(t). The methodology described below is independent of this.

The frequency response is determined in a known manner from the Fourier transform of the input signal u(t) and the output signal y(t). If U(k) denotes the Fourier transform of the input signal u(t) at frequency $k=j\omega_k$ and Y(k) denotes the Fourier transform of the output signal y(t) at frequency $k=j\omega_k$, then the frequency response G(k) results as the quotient of the Fourier transforms Y(k) of the output signal y(t) and U(k) of the input signal u(t). It is also known to take into account noise of the input signal u(t) and the output signal y(t). Noise results, for example, from a measurement noise when measuring physical quantities, from deviations between a setpoint specification on the test bench and the adjustment of the setpoint at the test bench, from process noise, etc. If $n_u(t)$ denotes the noise at the input and $n_y(t)$ denotes the noise at the output, then the input signal u(t) in the time domain can also be written as $u(t)=u_0(t)+n_u(t)$ or in the frequency domain as $U(k)=U_0(k)+N_u(k)$ and the output signal y(t) in the time domain as $y(t)=y_0(t)+n_y(t)$ or in the frequency domain as $Y(k)=Y_0(k)+N_y(k)$, with the noise-free signals $u_0$, $y_0$, or $U_0$, $Y_0$, and the noise signals $n_u$, $n_y$ or $N_u$, $N_y$.

In order to approximate the frequency response G in the presence of input and output noise, there are various known nonparametric identification methods, for example spectral analysis or the local polynomial method (LPM). In the spectral analysis, either the amplitude spectrum or the power spectrum of the frequency response is evaluated, such as described in L. Ljung, "*System Identification: Theory for the User,*" 2nd Edition Prentice Hall PTR, 1999 or in Thomas Kuttner, "*Praxiswissen Schwingungsmesstechnik,*" p. 325-335, *Springer Vieweg* 2015. The local polynomial method is described, for example, in R. Pintelon, et al., "*Estimation of non-paramteric noise and FRF models for multivariable systems—Part I: Theory,*" Mechanical Systems and Signal Processing, volume 24, Issue 3, p. 573-595, 2010. The determination of the frequency response G is briefly explained below using the example of LPM In LPM, the frequency response G is locally approximated around a local frequency k via a polynomial. This is done for all frequencies $j\omega_k$ of the frequency response G. If a generalized frequency $\Omega_k$ is used, with $\Omega_k=j\omega_k$ for the continuous-time case and $\Omega_k=e^{-j\omega k}$ for the time-discrete case, the input-output behavior of the dynamic system (test setup PA) can be written in the form of $$Y(k)=G(\Omega_k)U(k)+T(\Omega_k)+V(k).$$

Therein, $G(\Omega_k)$ denotes the Fourier transform of the transfer function of the dynamic system (i.e. the frequency response between the selected input and output), $T(\Omega_k)$ a transient error in the output at the frequency $\Omega_k$, which is not due to the excitation, and V(k) the measurement noise of the output signal. U(k) and Y(k) are the Fourier transforms of the measured input signal u(t) and output signal y(t).

The variables dependent of the frequency $\Omega_k$ are approximated via local polynomials around a local frequency $\Omega_k$. The frequencies around $\Omega_k$ are indicated by the variable r=−n, −n+1, . . . , n, whereby n is specified or selected. That leads to $$G(\Omega_{k+r}) \approx G(\Omega_k) + \sum_{s=1}^{R} g_s(k)r^s$$

$$T(\Omega_{k+r}) \approx T(\Omega_k) + \sum_{s=1}^{R} t_s(k)r^s$$

$$Y(k+r) \approx \left[G(\Omega_k) + \sum_{s=1}^{R} g_s(k)r^s\right] U(k+r) +$$

$$T(\Omega_k) + \sum_{s=1}^{R} t_s(k)r^s + V(k+1).$$

Therein, $g_s$ and $t_s$ denote the 2(R+1) unknown parameters of the local polynomials of the order R (which is chosen or specified). This gives a total of 2n+1 equations for 2(R+1) unknowns ($g_s$, $t_s$) based on the r for each frequency k. With a parameter vector $\Theta(k)$ [$G(\Omega_k)$ $g_1(k)g_2(k)$ . . . $g_R(k)T(\Omega_k)$ $t_1(k)$ $t_2(k)$ . . . $t_R(k)$], the 2n+1 equations can be written in matrix form $Y(k) \approx \Phi(k)\Theta(k)$, with the matrix $$\Phi(k) = \begin{bmatrix} \cdot \\ \cdot \\ [1\ r^1\ \ldots\ r^R]\ U(k+r)\ 1\ r^1\ \ldots\ r^R \\ \cdot \\ \cdot \end{bmatrix}.$$

Therein the resultant 2n+1 equations for the frequencies k are stacked one above the other. The advantage of this method is that the transient component $T(\Omega_k)$ can be directly estimated and does not have to be determined for certain frequency ranges by window approaches, such as in spectral analysis.

The parameter vector $\Theta(k)$ can then be estimated, for example in the sense of a least squares approximation, from a parameter estimate using the equation $\hat{\Theta}(k)=[\Phi(k)^H\Phi(k)]^{-1}\Phi(k)^HY(k)$, where "$()^H$" denotes the adjoint matrix (transposed and complex conjugate).

With the resultant residual $e(\Omega_{k+1}) = Y(k+r) - [G(\Omega_{k+1})U(k+r) T(\Omega_{k+1})]$ of the least squares approximation, the variance $\sigma_Y^2(k)$ of the measurement noise of the output signal can also be calculated with $$\sigma_Y^2(k) = \frac{1}{2n+1-R} \sum_{r=-n}^{n} |e(\Omega_{k+1})|^2.$$

This approximation then also provides direct estimates for the frequency response $\hat{G}(\Omega_k)$ and also for the transient components $\hat{T}(\Omega_k)$ Subsequently, "^" always refers to estimates. Depending on what is used as the input signal U(k) and as the output signal Y(k), there are of course different frequency responses $\hat{G}(\Omega_k)$.

The case of additionally noisy input signals u(t) or the case of feedback of the noisy output signal y(t) to the input (for example in the case of a closed control loop), which likewise leads to a noisy input signal u(t), can also be covered. In order to avoid systematic errors in the parameter estimation in the presence of input noise, the parameter estimation in this case is advantageously carried out on the closed control loop. This is not a significant limitation, since technical systems such as a test setup PA on a test bench 1 are usually operated in a closed control loop. A reference signal s(t) (or the Fourier transform S(k)) is assumed which corresponds to the setpoint specification for a closed control loop. The relationship between the input signal u(t) and the reference signal s(t) results from the transfer function R of the controller and the current actual values $y_{ist}$ to $u=(s-y_{ist}) \cdot R$. The frequency response $G_{ru}(\Omega_k)$ of the reference signal to the input U(k) and the frequency response $G_{ry}(\Omega_k)$ of the reference signal to the output Y(k) are then ascertained, for example as described above, which leads to estimated frequency responses $\hat{G}_{ru}(\Omega_k)$ and $\hat{G}_{ry}(\Omega_k)$, with $G_{rz}(\Omega_k) = [G_{ry}(\Omega_k) \ G_{ru}(\Omega_k)]^T$. $V_Y(k)$ denotes the measurement noise of the output signal Y(k) and $V_U(k)$ denotes the measurement noise of the input signal U(k). With $Z(k) = [Y(k) \ U(k)]^T$ and $Vz(k) = [V_Y(k) \ V_U(k)]^T$, the system equation can then be written in the form $Z(k) = G_{rz}(\Omega_k)R(k) + T_{rz}(\Omega_k) + V_Z(k)$, where $T_{rz}(\Omega_k) = [T_{ry}(\Omega_k) \ T_{ru}(\Omega_k)]^T$ denotes the transient system error on the input and the output. An estimate of the frequency response $\hat{G}(\Omega_k)$ in the presence of input noise and output noise then results from $\hat{G}(\Omega_k) = \hat{G}_{ry}(\Omega_k) \hat{G}_{ru}^{-1}(\Omega_k)$.

Analogous to the case with only an output noise variance $\sigma_Y^2(k)$ of the measurement noise of the output signal, in the case of input noise and output noise a variance $\alpha_U^2(k)$ of the measurement noise of the input signal and a covariance $\sigma_{YU}^2(k)$ of the noise between input and output can be determined.

For the excitation of the dynamic system, the torque generator DE, like the internal combustion engine 2, is preferably towed, that is to say not fired. Although also an operated torque generator DE, such as a fired internal combustion engine 2, would also be possible for excitation, this would make identification more complex because the torque generator DE itself would introduce speed oscillations. The torque sink DS coupled to the torque generator DE, the load machine 3, which can also drive by being designed as an electric motor, is therefore preferably used for the excitation. The torque sink DS introduces speed oscillations for excitation. The excitation can take place with various signals, such as a multisine signal (in which a plurality of frequencies are excited at the same time at any point in time) or a chirp signal (in which a single frequency is excited at any point in time, for example with a linear frequency increase). The excitation signal is the setpoint specification for the test bench 1 for excitation operation. For example, speed setpoint specifications for the controller of the load machine 3 are specified as the excitation signal.

Figure 2A:
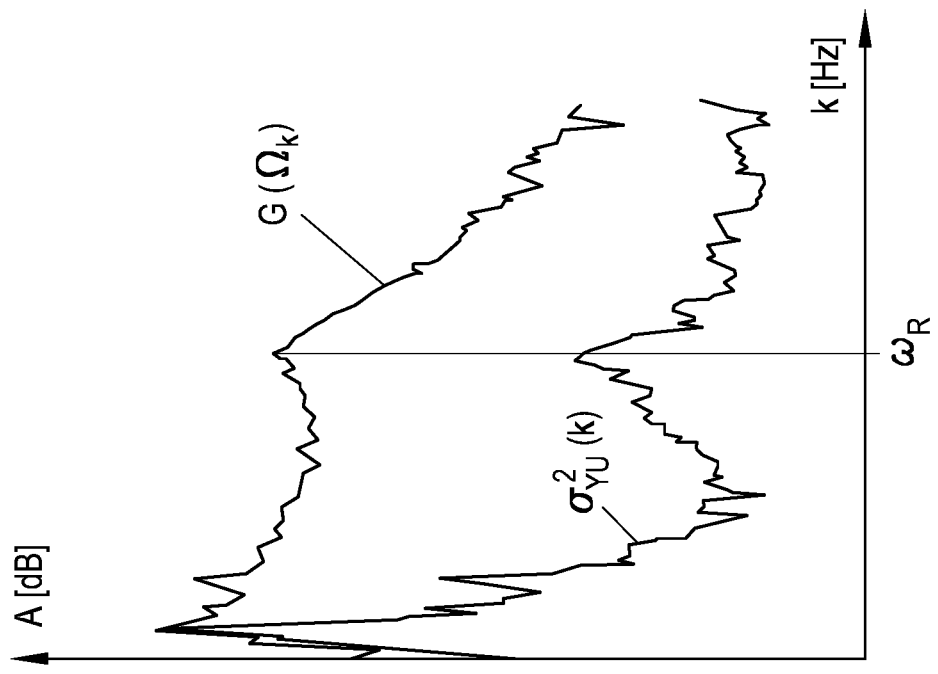
FIGS. 2a, 2b show examples of frequency responses of a dual-mass oscillator.
Figure 2B:
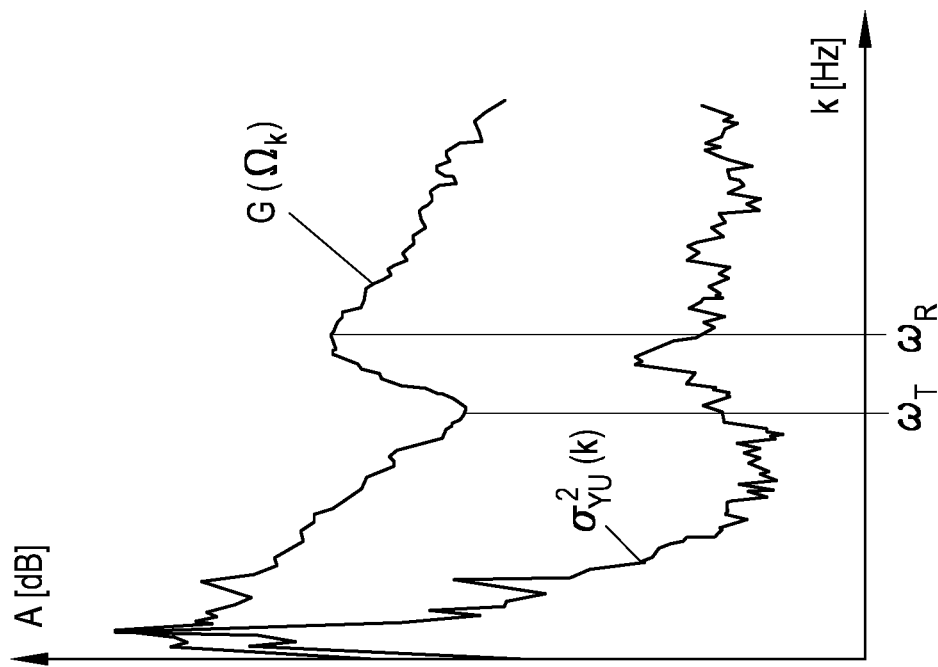

Some important properties of the dynamic system can be derived from a frequency response $G(\Omega_k)$, as explained by way of example in FIGS. 2a and 2b, in which the amplitude $A = |G(\Omega_k)|$ of the frequency response $G(\Omega_k)$ is shown. The frequency response $G(\Omega_k)$ with the torque $T_D$ of the load machine 3 as input u(t) and the speed $\omega_D$ of the load machine 3 as output y(t) are shown in FIG. 2a, and the frequency response $G(\Omega_k)$ is shown in FIG. 2b with the torque $T_D$ of the load machine 3 as the input u(t) and the speed $\omega_E$ of the internal combustion engine 2 as the output y(t). This means that upon excitation, the input u(t) and the output u(t) are measured and, as described, the frequency response $G(\Omega_k)$ is determined from their Fourier transforms U(k), Y(k). Of course, different input signal/output signal combinations can be used, for example depending on which measurement variables are available.

For example, resonance frequencies $\omega_R$ and/or eradication frequencies $\omega_F$ can be derived from the frequency response $G(\Omega_k)$. Both frequencies can be ascertained by determining minima and maxima and the gradients in the frequency response $G(\Omega_k)$. An eradication frequency $\omega_T$ is therefore a minimum with a gradient reversal from negative to positive. A resonance frequency $\omega_R$ a maximum with gradient reversal from positive to negative. Of course, a plurality of or no eradication frequencies $\omega_T$ and/or resonance frequencies $\omega_R$ can occur in the frequency response $G(\Omega_k)$. Furthermore, information on the zeros can also be derived from the frequency response $G(\Omega_k)$. In principle, characteristic frequency responses for various systems are known, for example for a dual-mass oscillation system (FIGS. 2a, 2b) or a multi-mass oscillator. By comparing the known frequency responses with the ascertained frequency response $G(\Omega_k)$, a certain model structure can be concluded. As the frequency response $G(\Omega_k)$ can be represented in the form of numerator polynomial to denominator polynomial, this comparison can be used, for example, to determine the order of the numerator and denominator polynomial (which corresponds to the model structure). The number of resonance frequencies $\omega_R$ can also be used to draw conclusions about the model structure. The number of resonance frequencies $\omega_R$ usually corresponds to the number of oscillatable masses minus one. A dual-mass oscillation system accordingly has one resonance frequency $\omega_R$ (as for example in FIGS. 2a, 2b).

Different characteristic frequency responses $G(\Omega_k)$ result for different system configurations (with oscillatable masses and mechanical couplings between them), which are however known. The characteristic frequency responses $G(\Omega_k)$ can be stored, for example, in order to be able to infer a model structure of the present test setup PA by comparing the estimated frequency response $\hat{G}(\Omega_k)$.

The respective determined covariances $\sigma_{YU}^2(k)$ are also shown in FIGS. 2a and 2b.

The advantage of this procedure can also be seen in the fact that one can get by for the nonparametric identification under certain circumstances without measuring a torque on the test bench 1, for example to select a model structure. This allows a first estimate of the dynamic response of the test setup PA on the test bench 1, in particular, without including a torque measuring flange in the test setup PA.

According to the present teaching, the nonparametric identification method is followed by a parametric identification method with which the dynamic input-output behavior of the dynamic technical system (test setup PA) is approximated with a model with system parameters SP which describe the dynamic response of the test setup PA. There are also known methods for this, both in the time domain and in the frequency domain, which are briefly explained below.

The parametric identification is based on a model of the dynamic system with the model parameters θ, which calculates the output y(k) from the input u(k) and a disturbance. The mapping of the input u(k) to the output y(k) takes place with a plant model $$G(q, \theta) = \sum_{k=1}^{inf} g_\theta q^{-k},$$

with plant model parameters $g_\theta$ and the backward shift operator $q^{-k}$. A disturbance (e.g. due to measurement noise) can be modeled with a disturbance model H(q, θ) and a probability distribution e, or a probability density function $f_\theta$, with $$H(q, \theta) = 1 + \sum_{k=1}^{inf} h_\theta q^{-k}$$

and noise model parameters $h_\theta$. It should be noted that k does not denote a frequency as in nonparametric identification, but rather a time index of the discrete-time signals, e.g. u(k) and y(k). The model of the dynamic system can then be written in a discrete-time notation as y(k)=G(q,θ)u(k)+H(q,θ)e(k). The goal is therefore to estimate with this model the output y(k) at the time k from known past data of the input u and the output y up to the time k−1 (i.e. past data). The data $Z_K$={u(1), y(1), . . . , u(k−1), y(k−1), u(k), y(k)} are available. There are various known approaches for this.

An example of a parametric identification method in the time domain is the so-called Prediction Error Method (PEM), as described, for example, in L. Ljung, "*System Identification: Theory for the User,*" 2nd Edition Prentice Hall PTR, 1999. A known method in the frequency domain is the Maximum Likelihood Estimator Method (MLE).

PEM is based on the model of the dynamic system $$y(k) = G(q, \theta)u(k) + \underbrace{H(q, \theta)e(k)}_{v(k)},$$

where θ are the model parameters. Here, v(k) denotes colored noise. If white noise is used as the probability distribution e(k), the colored noise v(k) can also be written as $$v(k) = H(q, \theta)e(k) = \sum_{t=0}^{\infty} h(t)e(k-t) = e(k) + m(k-1).$$

Therein, m(k−1) is the mean value up to time (k−1). This can be rewritten in the form m(k−1)=v̂(k|k−1)=(H(q,θ)−1)e(k)=(1−$H_{inv}$(q,θ))v(k), with the inverse $H_{inv}$ of H. The estimate of the output ŷ(k|k−1) from the data $Z_K$ can then be written in the following form: ŷ(k|θ,$Z_K$)=G(q,θ)u(k)+v̂(k|k−1)=$H_{inv}$(q,θ)G(q,θ)u(k)+(1−$H_{inv}$(q,θ))y(k).

The estimation error then results in ε(k,θ)=y(k)−ŷ(k,θ). In order to determine the model parameters θ, a cost function J(θ,$Z_K$) can be used that minimizes the weighted estimation error. For example, a mathematical norm l( ), for example the Euclidean norm (2 norm) $1( )=\|( )\|_2$, of the weighted estimation error can be used. If $\varepsilon_F$(k,θ)=F(q)ε(k,θ) denotes the weighted estimation error with the weights F(q), then the cost function can be written as $$J(\theta, Z_K) = \frac{1}{K}\sum_{k=0}^{K-1} l(\varepsilon_F(k, \theta)),$$

for example. This cost function J is minimized to estimate the model parameters θ:

$$\hat{\theta} = \arg\min_\theta J(\theta, Z_K).$$

In order to determine the sought system parameters SP of the dynamic system from the model parameters θ, the time discrete model y(k)=G(q,θ)u(k)+H(q,θ)e(k) can also be written in an advantageous practical implementation in the form $$y(k) = \underbrace{\frac{B(q)}{A(q)}}_{G}u(k) + \underbrace{\frac{C(q)}{A(q)}}_{H}e(k)$$

(ARMAX model) with polynomials A(q)= $1+a_1q^{-1}+ \ldots +a_{na}q^{-na}$, B(q)=$1+b_1q^{-1}+ \ldots +b_{nb}q^{-nb}$, and C(q)=$1+c_1q^{-1}+ \ldots +c_{nc}q^{-nc}$. The model parameters θ then result in θ=[$a_1 \ldots a_{na}$ $b_1 \ldots b_{nb}$ $c_1 \ldots c_{nc}$]. In the case of white noise e(k), this is reduced to $$y(k) = \underbrace{\frac{B(q)}{A(q)}}_{G}u(k) + \underbrace{\frac{1}{A(q)}}_{H}e(k)$$

(ARX model) with θ=[$a_1 \ldots a_{na}$ $b_1 \ldots b_{nb}$]. The order $n_a$, $n_b$, $n_c$ of the polynomials A, B, C is specified in accordance with the model structure defined with the nonparametric identification.

In the case of a dual-mass oscillator, for example in a test setup according to FIG. 1, the denominator polynomial A(q) is a polynomial with order $n_a$=2 and the numerator polynomial B(q) is a polynomial with order $n_b$=1.

In order to arrive at the sought system parameters SP, an equivalence of the model parameters in the discrete-time model and the parameters of a physical model of the dynamic system is assumed.

For example, the test setup PA according to FIG. 1 having the internal combustion engine 2 (with mass inertia $J_E$), test bench shaft 4 (with torsional rigidity c and torsional damping d) and load machine 3 (with mass torque of inertia $J_D$) can physically be modeled according to $$\frac{\omega_D}{T_D} = \frac{1}{s}\frac{J_E s^2 + ds + c}{J_E J_D s^2 + d(J_E + J_D)s + c(J_E + J_D)}$$

$$\frac{\omega_E}{T_D} = \frac{1}{s} \frac{ds+c}{J_E J_D s^2 + d(J_E+J_D)s + c(J_E+J_D)}.$$

Another example arises in the dual-mass oscillator of FIG. 1 with the input signal wo and the output signal $\omega_E$, which leads to a model $$\frac{\omega_E}{\omega_D} = \frac{c+ds}{J_E s^2 + ds + c}.$$

In this case, the frequency response G would of course also have been ascertained with this input signal and output signal. This also shows that different models result from different input and/or output signals. These equations can be put into a discrete-time notation, which allows a comparison of the system parameters SP ($J_E$, c, d, $J_D$) with the estimated model parameters $\theta=[a_1 \ldots a_{na} \; b_1 \ldots b_{nb}]$. The system parameters SP ($J_E$, c, d, $J_D$) can be determined from this.

As the model structure is known from the frequency response G, the model can also be divided into sub-models, which makes it easier to determine the system parameters SP ($J_E$, c, d, $J_D$). A dual-mass oscillator can be divided, for example, into a first sub-model for the internal combustion engine 2, a second sub-model for the test bench shaft 4, and a third submodel for the load machine 3. The discrete-time model can thus also be subdivided into corresponding sub-models, which reduces the order of the sub-models accordingly. The model parameters of the sub-models are then estimated as described above.

Physical sub-models are then used in the same way, which is described again below using the example of the dual-mass oscillator.

For the first sub-model, the torque equilibrium for the internal combustion engine 2 (FIG. 1) is written in time-continuous notation in the form $$\omega_E = \frac{1}{J_E s}(T_E(s) - T_{sh}(s))$$

with the Laplace operator s, the speed $\omega_E$ of the internal combustion engine 2, the internal torque $T_E$ of the internal combustion engine 2, and the shaft torque $T_{sh}$. As the internal combustion engine 2 is preferably operated in a towed manner, the non-stochastic part of the model structure results in $T_E=0$ and consequently $$\omega_E = -\frac{1}{J_E s} T_{sh}(s) \text{ or } \omega_E(k) - \omega_E(k-1) = -\frac{Ts}{J_E} T_{sh}(k)$$

in time-discrete notation with the known sampling time Ts (typically in the kHz range). By comparison, $a_1=-1$ and $b_1=Ts/J_E$ are directly obtained from the first sub-model, from which the system parameter $J_E$ can be ascertained. This also allows the evaluation of the quality of the parameter estimation. If the estimated model parameter $a_1$ is close to one, then a high identification quality can be assumed.

In order to determine the system parameters SP of the coupling between the internal combustion engine 2 and the load machine 3, torsional damping d and torsional rigidity c, the second sub-model for the test bench shaft 4 is used. Starting from the torque equilibrium on the cut-out test bench shaft 4, it can be written with a $\Delta\omega=\omega_E-\omega_D$, with the speed $\omega_D$ of the load machine 3, and again with the assumption $$T_E = 0 \; T_{sh}(s) = \left(-\frac{c}{s}+d\right)\Delta\omega(s)$$

or in time-discrete notation $T_{sh}(k)-T_{sh}(k-1)=(-cTs+d)\Delta\omega(k)-d\Delta\omega(k-1)$. By comparison, the system parameters $a_1=-1$, $b_1=-(cTs+d)$ and $b_2=-d$ again result from the model parameters of the second sub-model, from which the sought system parameters c, d can be determined. The model parameters $a_1$, $b_1$ of the second sub-model naturally do not correspond to the model parameters of the first sub-model.

In the same way, a third sub-model can be used for the load machine 3 in order to determine the system parameter $J_D$. The inertia $J_D$ of the load machine can of course also be ascertained for the dual-mass oscillator from the resonance frequency $\omega_R$, which is known from the nonparametric identification, for example as $$J_D = \frac{c}{\omega_R^2 - \frac{c}{J_E}}.$$

The inertia $J_D$ of the load machine 3 is often known, so that the quality of the identification inertia can also be determined with the known inertia.

As already mentioned, the parametric identification can also take place in the frequency domain, for example using MLE With MLE, the model parameters $\theta$ are estimated, which maximize the so-called likelihood function. This known method is briefly explained below.

MLE uses the measurement data of the output signal $y=y_1, y_2, \ldots y_N$ and an associated probability density function $f_{ny}$, assumed to be known, of the measurement noise at the output, which is described by the model parameters $\theta$, $f(y|\theta_0)$ describes the probability distribution function of the randomly dependent part of the estimation problem. With a hypothetical model $y_0=G(u_0,\theta)$, which describes the excitations and the parameters, the likelihood function can be written as $f(y|\theta,u_0)=f_{ny}(y-y_0)$ in the case of measurement noise at the output. Therein, $u_0$ denotes the noiseless input. The unknown model parameters $\theta$ can then be determined by maximizing the likelihood function f:

$$\hat{\theta}(N) = \arg\max_\theta f(y|\theta, u_0).$$

In the case of additional measurement noise at the input, the likelihood function can be written as $f(y,u|\theta, y_0,u_0)=f_{ny}(y-y_0)f_{n\theta}(u-u_0)$, with the probability density function $f_{nU}$ of the measurement noise at the input.

A Gaussian cost function $$V_{ML}(\theta, Z) = \sum_{k=1}^{F} \frac{|e(\Omega_k, \theta, Z(k))|^2}{\sigma_e^2(\Omega_k, \theta)}$$

(likelihood function f) can be written on the assumption that the noise at the input and output have a mean value of zero, are normally distributed, and are independent of the frequencies. Therein, θ is the parameter vector and Z(k)=[Y(k) U(k)] denotes the available measurement data of the input U(k) and the output Y(k). e denotes an error over all frequencies $\Omega_k$ of the form $e(\Omega_k, \theta, Z(k)) = Y(k) - G(\Omega_k, \theta)U(k)$ and $\sigma_e$ denotes the covariance of the error e in the form $\sigma_e^2(\Omega_k, \theta) = \sigma_Y^2(k) + |G(\Omega_k, \theta)|^2 \sigma_U^2(k) - 2\operatorname{Re}(\vec{G}(\Omega_k)\sigma_{YU}^2(k))$. Re denotes the real part. As can be seen, the variances and covariance of the measurement noise at the input $\sigma_U^2(k)$, output $\sigma_Y^2(k)$, and input-output $\sigma_{YU}^2(k)$ are required for the above equations. These can advantageously be obtained from the nonparametric identification as described above. Since the resultant optimization problem of maximizing the cost function $V_{ML}$ (likelihood function) is non-linear, the optimization is solved, for example, with the well-known Levenberg-Marquardt method. The convergence of the optimality of the optimization substantially depends on the initial values of the optimization. Estimated values of the sought system parameters SP can be used as initial values or other known initialization methods, for example from a generalized total least square method can be used.

If a parametric transfer function $$G(\Omega_k, \theta) = \frac{B_\theta(\Omega_k)}{A_\theta(\Omega_k)}$$

is used, the cost function for MLE can be rewritten to $$V_{ML}(\theta, Z) = \frac{1}{F}\sum_{k=1}^{F} \frac{|A_\theta(\Omega_k)Y(k) - B_\theta(\Omega_k)Y(k)|^2}{\hat{\sigma}_Y^2(k)|A_\theta(\Omega_k)|^2 \hat{\sigma}_U^2(k)|B_\theta(\Omega_k)|^2 - 2\operatorname{Re}(\hat{\sigma}_{YU}^2(k)A_\theta(\Omega_k)\overline{B_\theta(\Omega_k)})}.$$

Here, A and B are again polynomials $A(q) = 1 + a_1 q^{-1} + \ldots + a_{na} q^{-na}$, $B(q) = 1 + b_1 q^{-1} + \ldots + b_{nb} q^{-nb}$. The order $n_a$, $n_b$ of the polynomials again results from the frequency response $\hat{G}(\Omega_k)$ estimated with the nonparametric identification. From the optimization, the model parameters $\theta = [a_1 \ldots a_{na} \ b_1 \ldots b_{nb}]$ are again obtained, which in turn are again compared with a physical model of the dynamic system (test setup PA) in order to arrive at the system parameters SP ($J_E$, c, d, $J_D$). In the same way, sub-models can also be used again in order to simplify the determination of the system parameters SP ($J_E$, c, d, $J_D$).

The sub-models for the internal combustion engine 2 and the test bench shaft 4 in time-discrete notation with the z-transformation result in $$\omega_E(k) = -\frac{\frac{T_s}{J_E}}{1 - z^{-1}} T_{sh}(k) \text{ and } T_{sh}(s) = \frac{(d - T_s d) - dz^{-1}}{1 - z^{-1}} \Delta\omega(k),$$

from which the system parameters SP ($J_E$, c, d, $J_D$) result from the estimated sub-models in $$J_E = \frac{T_s}{b_1}, \ J_D = \frac{c}{\omega_R^2 - \frac{c}{J_E}}, \ c = \frac{(b_2 + b_1)}{T_s}, \ d = -b_s.$$

The parametric identification thus supplies the system parameters SP ($J_E$, c, d, $J_D$ in the case of the dual-mass oscillator) of the excited dynamic system (the test setup PA as shown, for example, in FIG. 1). With at least one system parameter SP, a controller for certain components of the test setup can now be designed, for example, using conventional controller design methods, for example a speed controller for the load machine 3 or a torque controller for the internal combustion engine 2.

Figure 3:
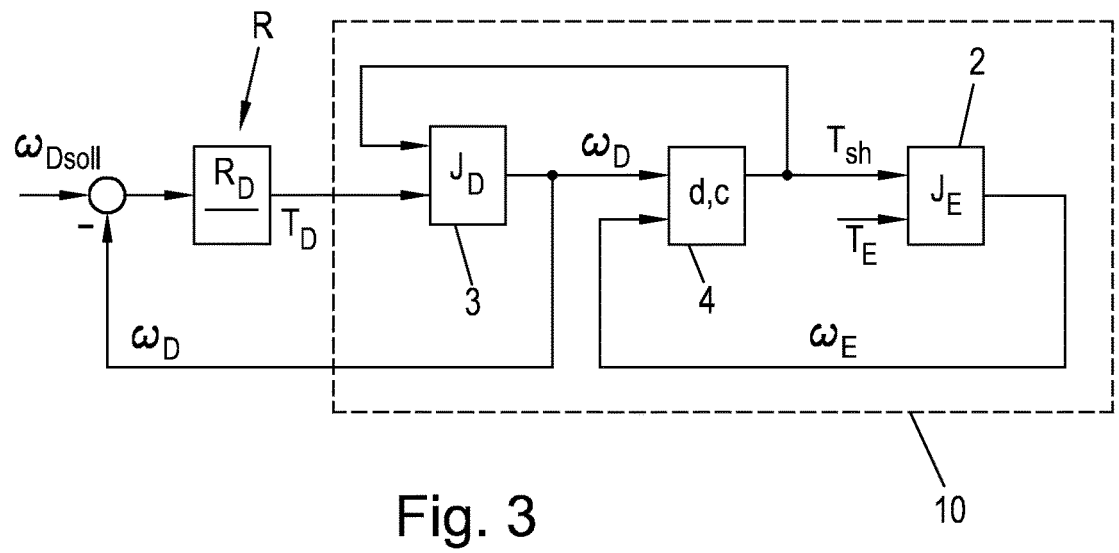
FIG. 3 shows a controller for regulating a component of the test setup.

A closed control loop for the test setup PA according to FIG. 1 is shown in FIG. 3 by way of example. The controlled system 10 represents the test setup PA with the mass torque of inertia $J_E$ of the internal combustion engine 2 and $J_D$ of the load machine 3. The test bench shaft 4 is represented by the torsional rigidity c and torsional damping d. These system parameters SP were determined by the above nonparametric/parametric identification. The load machine 3 is speed-controlled by a dyno controller $R_D$ (for example a PI controller). For this purpose, a target speed $\omega_{Dsoll}$ is specified. The resulting actual speed $\omega_D$ is measured on test bench 1. The control error $\omega_{Dsoll} - \omega_D$ is compensated by the dyno controller $R_D$ according to the specified controller response. The controller parameters for setting the desired control response on the specific dynamic system can be determined using a well-known controller design method.

Figure 4:
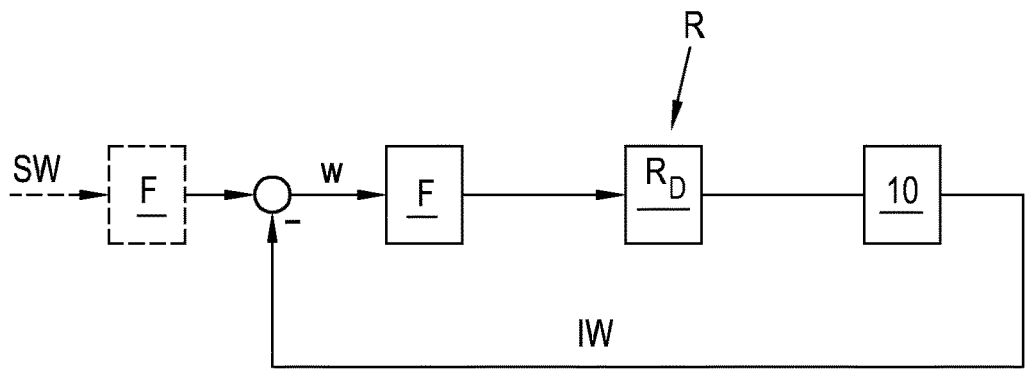
FIG. 4 shows the use of a filter for carrying out a test run on the test bench.

The resonance frequency (frequencies) $\omega_R$ ascertained with the nonparametric identification, which also represent a system parameter SP, can also be used to design a filter F that is intended to prevent possible resonances on the test bench 1. The aim of the filter F is to prevent excitation with a resonance frequency $\omega_R$ In order to influence the dynamic response of the test setup PA on a test bench 1 with a filter F as little as possible, filters F may be used which filter out frequencies within a narrow frequency range, for example so-called notch filters. For this purpose, the notch filter is designed so that frequencies in a narrow frequency range around the resonance frequency $\omega_R$ are filtered out. Such a filter F can be used in front of a controller R for a component of the test setup PA, for example the dyno controller $R_D$, for filtering the control deviation w supplied to the controller R (difference between the setpoint SW and the actual value IW of the controlled variable) (as in FIG. 4), or for filtering the setpoints SW (e.g. a setpoint speed $\omega_{Dsoll}$) for the controller R (as indicated by the broken line in FIG. 4).

The identified system parameters SP ($\omega_R$, $J_E$, c, d, $J_D$), or at least one of them, can also be used for an observer to estimate non-measurable variables of the test setup, for example an internal effective torque $T_E$ of the internal combustion engine 2.

Likewise, the identified system parameters SP ($\omega_R$, $J_E$, c, d, $J_D$), or at least one of them, can be used to determine changes in the test setup PA, for example due to aging, damage, configuration changes, etc. For this purpose, the system parameters SP ($J_E$, c, d, $J_D$) can be newly determined at regular intervals and the change over time of the system parameters SP ($J_E$, c, d, $J_D$) can be monitored. The test run can be adapted or interrupted if an unusual or undesired change is detected.

Last but not least, the test setup PA for carrying out the bench test itself can also be changed in order to change the at least one identified system parameter SP in order to represent a desired dynamic response on the test bench 1. This can be used, for example, to adapt the dynamics of the test setup PA on the test bench 1 to the dynamics of a vehicle in which the torque generator DE of the test setup PA is to be used.

Figure 6:
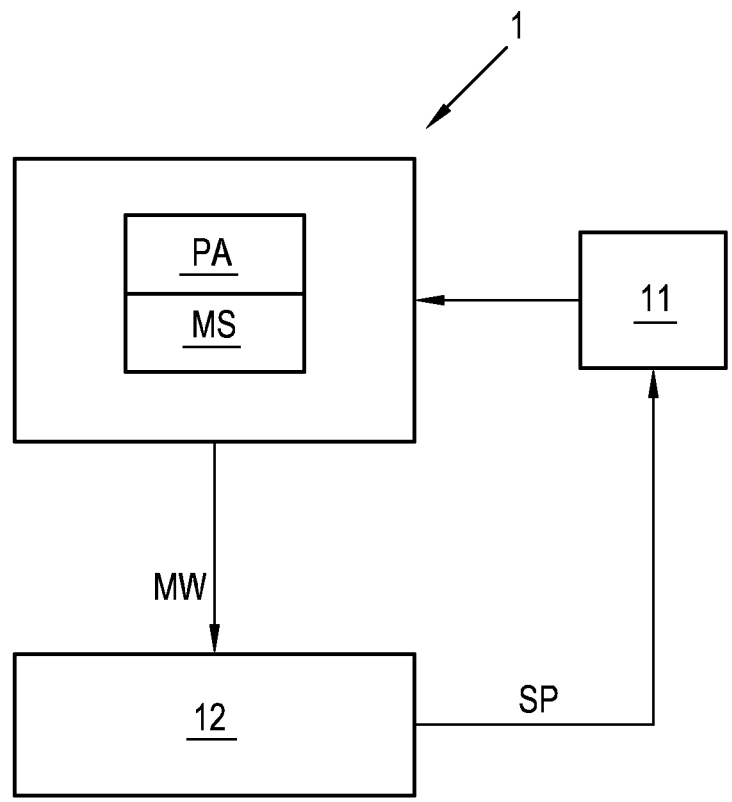
FIG. 6 shows an implementation of the present teaching on the test bench.

A test bench 1 having a test setup PA, for example with a dual-mass oscillator as in FIG. 1, is indicated in FIG. 6. Measured values MW for the required input signals u(t) and output signals y(t) with dynamic excitation are recorded on the test setup PA with suitable measurement sensors MS, which of course also includes the time-discrete detection of the signals u(k), y(k). The required system parameters SP, for example $J_E$, c, d, $J_D$, of the test setup PA are determined from the measured values MW in an evaluation unit 12 (hardware and/or software). At least one identified system parameter SP is used in a test bench control unit 11 (hardware and/or software) for carrying out a test run on the test bench 1 with the test setup PA. The evaluation unit 12 and the test bench control unit 11 can of course also be integrated in a common unit. The excitation of the test setup control unit 11 occurs by means of the test setup PA. The at least one identified system parameter SP can be used on the test bench 1 to carry out the test run as described.

Although the present teaching was described above using the example of a dual-mass test setup, it is obvious that the present teaching can also be expanded to any multi-mass test setup, for example in the case of a drive train test bench in which the torque generator DE is connected via a combination of shafts, couplings, shaft couplings, and/or gearboxes to a torque sink DS. In order to carry out a test run, a test object with a torque generator DE, for example an internal combustion engine 2, an electric motor, but also a combination of an internal combustion engine 2 and an electric motor, is mechanically coupled with a torque sink DS, for example a load machine 3. The coupling is made with at least one coupling element KE, for example with a test bench shaft 4, as shown in FIG. 1 for the dual mass test bench. However, the coupling can also be carried out with a coupling element KE, which comprises various mechanical couplings, which can also include further mass inertias (multi-mass test setup), such as, for example, in the case of a drive train as a test object on the test bench 1.

Figure 5:
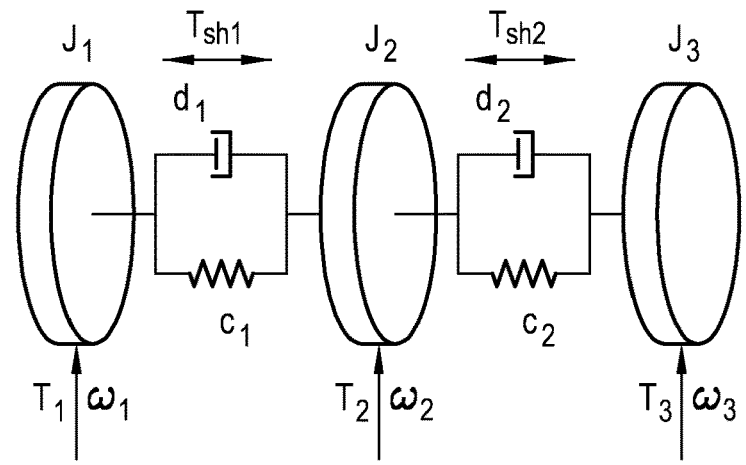
FIG. 5 shows an example of a three-mass oscillator.

For example, a three-mass test setup is shown in FIG. 5. This contains three mass inertias J1, J2, J3, which are connected by coupling elements, each with a torsional rigidity c1, c2, and a torsional damping d1, d2. J1 is, for example, a torque generator DE, for example an internal combustion engine 2, and J2, J3 torque sinks DS, for example a torque measuring flange, a dual-mass flywheel or a clutch and a load machine 3. A configuration with two torque generators DE, an internal combustion engine 2 and an electric motor, and a torque sink DS, a load machine 3, is of course also conceivable. The system parameters SP (J1, J2, J3, c1, c2, d1, d2) can be identified according to the present teaching in an analogous manner to that described above.

Depending on which measurement variables are available, the following configurations are possible, for example:

| Known parameters | Measured signals (u(t), y(t)) | Identified system parameters SP |
|---|---|---|
| — | ω1, ω2, ω3, Tsh1, Tsh2 | J1, J2, c1, c2 |
| J1, J2 | Tsh2, ω2 | c1, d1 |
| J1, J2 | Tsh2, ω2, T2 | c1, d1 |
| — | ω2, ω3, Tsh2 | c2, d2 |
| — | ω1, ω2, ω3, T2, Tsh2 | (J1 + J2), c2, d2 |
| J2 | ω1, ω2, Tsh2 | J1, c1 |

The invention claimed is:

1. A method for carrying out a dynamic test run for a test setup on a test bench, the test setup comprising:
   at least one torque generator, which is mechanically coupled on the test bench with at least one torque sink by at least one coupling element,
   wherein the torque generator, the coupling element, and the torque sink are described with system parameters characterizing a dynamic response,
   the method comprising:
   dynamically exciting the test setup on the test bench by virtue of a dynamic input signal being applied to the test setup,
   recording measured values of the input signal of the test setup and of a resultant output signal of the test setup,
   determining a frequency response of the dynamic response of the test setup between the output signal and the input signal from the recorded input signal and output signal using a nonparametric identification method,
   deriving a model structure of a parametric model that maps the input signal onto the output signal from the frequency response, the model structure corresponding to the order of a numerator and denominator polynomial of the frequency response,
   determining at least one system parameter of the test setup using the model structure and a parametric identification method, and
   performing the test run using the at least one system parameter.

2. The method according to claim 1, wherein the at least one system parameter is used for designing a controller for at least one component of the test setup.

3. The method according to claim 1, wherein the at least one system parameter is used for designing a filter that either filters a setpoint for a controller for at least one component of the test setup or a control deviation fed to a controller for at least one component of the test setup.

4. The method according to claim 1, wherein a change in the at least one system parameter is monitored over time.

5. The method according to claim 1, wherein the at least one system parameter is used to adapt the dynamic response of the test setup to a desired dynamic response.

6. The method according to claim 1, wherein measurement noise of the input signal and/or of the output signal is taken into account in the nonparametric identification method.

7. The method according to claim 1, wherein from the frequency response a resonance frequencies and/or an eradication frequencies is determined as the system parameter.

8. The method according to claim 1, wherein the parametric identification method comprises a prediction error method in the time domain.

9. The method according to claim 1, wherein model parameters of the parametric model are determined with the parametric identification method and by comparing the parametric model with a physical system model with the at least one system parameter, the at least one system parameter is determined from the model parameters.

10. The method according to claim 1, wherein the parametric identification method comprises a maximum likelihood estimator method in the frequency domain.

11. A method for carrying out a dynamic test run for a test setup on a test bench, the test setup comprising:
   at least one torque generator, which is mechanically coupled on the test bench with at least one torque sink by at least one coupling element, wherein the torque generator, the coupling element, and the torque sink are described with system parameters characterizing a dynamic response, the method comprising:

dynamically exciting the test setup on the test bench by virtue of a dynamic input signal being applied to the test setup, recording measured values of the input signal of the test setup and of a resultant output signal of the test setup, determining a frequency response of the dynamic response of the test setup between the output signal and the input signal from the recorded input signal and output signal using a nonparametric identification method, deriving a model structure of a parametric model that maps the input signal onto the output signal from the frequency response, determining at least one system parameter of the test setup using the model structure and a parametric identification method, and performing the test run using the at least one system parameter, wherein the parametric model is divided into sub-models with respective model parameters and by comparing at least one sub-model with a physical sub-model with the at least one system parameter, the at least one system parameter is determined from the model parameters of the sub-model.

12. A method for carrying out a dynamic test run for a test setup on a test bench, the test setup comprising:

at least one torque generator, which is mechanically coupled on the test bench with at least one torque sink by at least one coupling element, wherein the torque generator, the coupling element, and the torque sink are described with system parameters characterizing a dynamic response, the method comprising:

dynamically exciting the test setup on the test bench by virtue of a dynamic input signal being applied to the test setup, recording measured values of the input signal of the test setup and of a resultant output signal of the test setup, determining a frequency response of the dynamic response of the test setup between the output signal and the input signal from the recorded input signal and output signal using a nonparametric identification method, deriving a model structure of a parametric model that maps the input signal onto the output signal from the frequency response, determining at least one system parameter of the test setup using the model structure and a parametric identification method, and performing the test run using the at least one system parameter, wherein the method of local polynomials is used as the nonparametric identification method which locally approximates the frequency response for all frequencies around a local frequency via a polynomial.

13. The method according to claim 12, wherein a variance of the measurement noise of the output signal and/or a variance of the measurement noise of the input signal and/or a covariance of the noise between input and output is additionally determined with the nonparametric identification method.

14. A test bench for carrying out a dynamic test run for a test setup, comprising:

at least one torque generator, which is mechanically coupled to at least one torque sink by at least one coupling element, wherein the torque generator, the coupling element, and the torque sink are described with system parameters characterizing a dynamic response, a test bench control unit which dynamically excites the test setup on the test bench by specifying an input signal for the test setup, measuring sensors that record measured values of the input signal and of a resultant output signal of the test setup, an evaluation unit which determines a frequency response of the dynamic response of the test setup between the output signal and the input signal from the recorded input signal and output signal using a nonparametric identification method, and which derives a model structure of a parametric model that maps the input signal onto the output signal from the frequency response, and which determines at least one system parameter based on the model structure and a parametric identification method of the test setup, the model structure corresponding to the order of a numerator and denominator polynomial of the frequency response, wherein the test bench control unit uses the at least one system parameter to perform the test run.

15. The test bench of claim 14, wherein the at least one system parameter is used for designing a controller for at least one component of the test setup.

16. The test bench of claim 14, wherein the at least one system parameter is used for designing a filter that either filters a setpoint for a controller for at least one component of the test setup or a control deviation fed to a controller for at least one component of the test setup.

17. The test bench of claim 14, wherein the method of local polynomials is used as the nonparametric identification method which locally approximates the frequency response for all frequencies around a local frequency via a polynomial.

18. The test bench of claim 14, wherein the parametric model is divided into sub-models with respective model parameters and by comparing at least one sub-model with a physical sub-model with the at least one system parameter, the at least a one system parameter is determined from the model parameters of the sub-model.

* * * * *